United States Patent Office 2,863,121
Patented Dec. 2, 1958

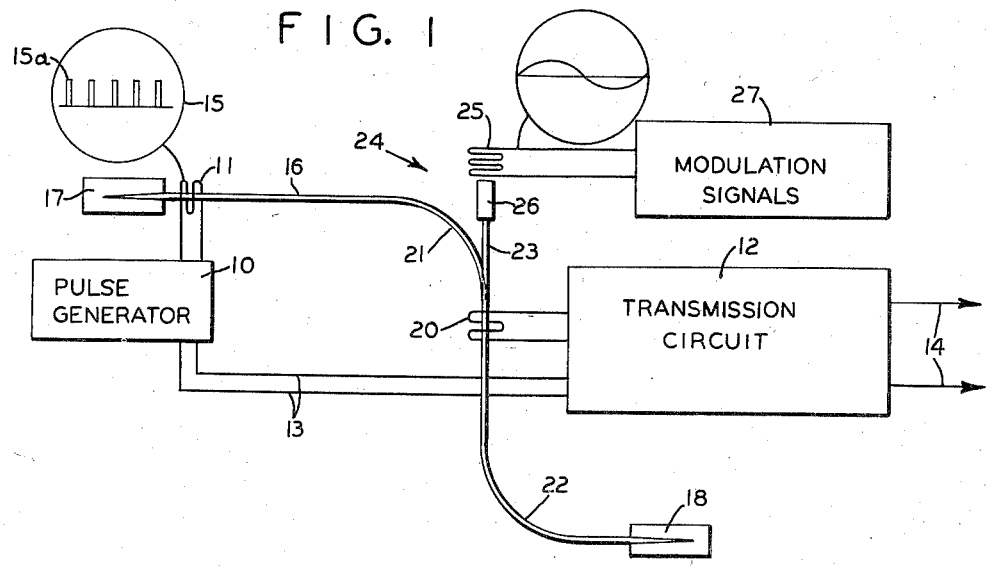
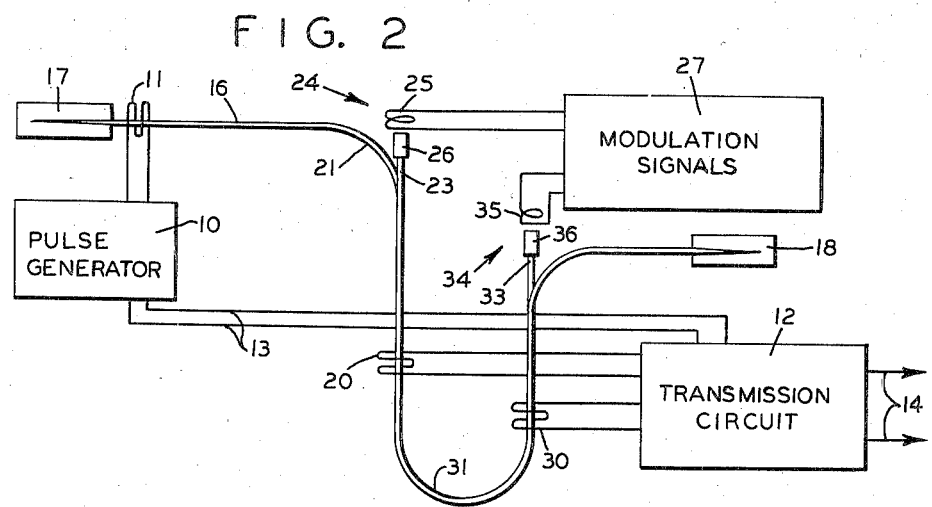
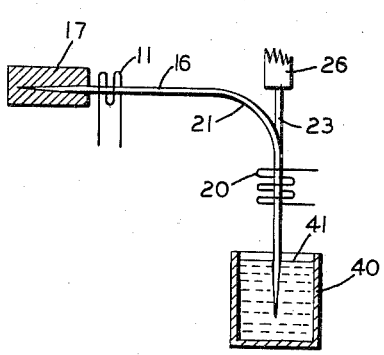
*INVENTOR.*
ALBERT E. POWELL
BY *John P. Chandler*
HIS ATTORNEY.

2,863,121

MAGNETOSTRICTIVE PULSE-TIME MODULATOR

Albert E. Powell, Chatham, N. J., assignor to Byford Labs, Inc., Mamaroneck, N. Y., a corporation of New York Application June 25, 1957, Serial No. 667,932

9 Claims. (Cl. 332—9)

This invention relates to a magnetostrictive delay means for modulating a pulse in accordance with pulse-time modulation for conveying information from a transmitting station to a receiving station. The invention has particular reference to a system of pulse modulation which is responsive to the position of a magnetostrictive delay line with reference to a pickup receiving coil.

The present invention is an improvement over the device shown and described in application Serial No. 641,506, filed February 21, 1957, by Albert E. Powell.

As used throughout the specification and claims, the term "pulse-time modulation" refers to a system of modulation wherein the time delay of a transmitted pulse in reference to a basic synchronization pulse conveys the information desired to be transmitted. This information may be proportional to a static dimension, such as a pressure, temperature, or voltage, or it may be the instantaneous magnitude of a sine wave which forms part of a series of sound waves.

Pulse-time modulation systems are old in the art and have been used in radar systems and in communication devices which transmit information from a robot plane or rocket to a ground receiving station. Values of pressure, temperature, and speed can be transmitted on a single radio frequency using a plurality of pulse-time modulated waves. Systems which employed pulse-time modulation in the past have required many vacuum tubes and one or more electrical delay lines. Some systems also required one or more gating tubes for switching information circuits at the transmitter station in order to separate the synchronizing pulses from the delayed pulses. The present system requires no electrical delay line, no gating tubes, and no electrical circuits which require precise and accurate adjustments for their operation. A magnetostrictive delay line is employed with a transmitting coil adjacent one end of the line, a plurality of stationary receiving coils spaced along the line for generating and transmitting received pulses, and means for increasing and decreasing the length of the line in accordance with a modulation signal.

One of the objects of this invention is to provide an improved modulation system which avoids one or more of the disadvantages and limitations of prior art arrangements.

Another object of the invention is to produce a pulse-time modulation without the use of electrical delay lines.

Another object of the invention is to provide a pulse-time modulation arrangement which is inexpensive and reliable.

Another object of the invention is to provide a pulse-time modulator arrangement which can easily be multiplexed by including a plurality of modulating coils.

Another object of the invention is to eliminate electronic gating circuits in the transmitting circuit of a pulse-time modulator.

Another object of the invention is to provide direct modulation of a pulse by mechanical controls such as temperature, pressure, and length.

The invention comprises a magnetostrictive delay line composed of a nickel ribbon or a plurality of fine nickel wires arranged in a bundle. A transmitting coil is positioned at one end of the line and one or more stationary receiving coils are positioned along the line at varying distances from the transmitting coil. The nickel line is formed in a loop and the portion passing through a receiving coil is secured to a copper rod which in turn is coupled to a transducer element controlled by a modulated source of energy. The movement of the nickel line through the receiving coil changes the effective length of the line from the transmitting coil to the receiving coil and therefore varies the elapsed time taken for a transmitted pulse to travel from the transmitting coil to the receiving coil.

For a better understanding of the present invention, together with other and further objects thereof, reference is made to the following description taken in connection with the accompanying drawings.

In the drawings:

Fig. 1 is a schematic diagram of connections, with some of the circuits shown in block, of the entire modulation system.

Fig. 2 is a schematic diagram similar to Fig. 1 but showing a double loop and two modulating transducers to produce multiplex modulation.

Fig. 3 is a diagram illustrating the use of a single bend in the magnetostrictive line with the end of the line immersed in a liquid damping medium.

Referring now to the diagram in Fig. 1, a pulse generator 10 is shown which is coupled to a transmitting coil 11 and to a transmission circuit 12 by means of conductors 13. The pulse generator may deliver the same type of pulse to coil 11 and circuit 12, and at the same time, but this is not necessary. The transmitting circuit is connected by conductors 14 to a transmitting system (not shown) which may be an antenna for radio transmission or a wire line which carries the pulses to a distant point.

Pulse generator 10 transmits pulses which are indicated graphically in the circle 15, these pulses being equally spaced and occurring at least five times the rate of the highest frequency of the modulation signal. Coil 11 is positioned around a magnetostrictive line 16 which may consist of a nickel ribbon or may be made up of a plurality of fine wires. At each end of the line absorbing masses 17 and 18 are positioned around the feathered edges of the line to absorb the transmitted energy and prevent reflection, such absorbing masses being well-known in the art.

A receiving coil 20 is positioned as indicated, around the delay line 16 but beyond a ninety degree bend 21. A similar bend 22 is given to the line so that the portion through coil 20 may be moved vertically to alter the line distance between coils 11 and 20. The line 16 may be controlled in its movement by a copper rod 23 soldered to the nickel line and coupled to a transducer 24. The transducer may include a coil 25 and an armature 26, fed from a modulation signal source 27, but any other type of transducer may be used such as piezoelectric, electrostatic, or magnetostrictive. The movement of the line 16 may also be controlled by temperature or pressure responsive mechanisms or by any movement which can be used to transmit information to a distant point.

The operation of this circuit is as follows: A synchronizing pulse, such as that indicated at 15a is transmitted simultaneously to coil 11 and over conductors 13 to circuit 12. The pulse transmitted over conductors 13 is sent out immediately over conductors 14 to the distant station. The pulse applied to coil 11 produces a mechanical disturbance in line 16 which travels from the coil 11 toward coil 20 at the speed of sound within nickel. A few microseconds later the pulse passes through coil 20 and in doing so creates a small electrical pulse in the coil which is applied to transmitting circuit 12 and, after being amplified, is transmitted over conductors 14 to an antenna or distant station.

If the line 16 is moved up by armature 26 it will be obvious that the sound pulse in line 16 will be picked up later by coil 20 because the effective length of the line is longer. If the line is moved down through coil 20 the line length is shorter and the pulse is picked up sooner. It is apparent that the mechanical movement of the nickel line, as controlled by transducer 24, alters the time delay of the pulse which is transmitted by coil 11 and this time delay will bear a similar time delay characteristic compared to the synchronizing pulse transmitted over conductors 13. After the pulse passes through coil 20 it continues around bend 22 to damping block 18 where it is absorbed.

Soldering a copper rod 23 to nickel line 16 or otherwise securing a portion of the line to a driving mechanism will generally create a small discontinuity in the line which results in a small reflection back toward the transmitting coil 11 and damping block 17. This reflected wave can cause no spurious signal in the system as long as the junction point between the line 16 and rod 23 is between the two coils 11 and 20.

The wiring diagram shown in Fig. 2 is the same as Fig. 1 except that two receiving coils 20 and 30 are shown. Two bends 21 and 31 are necessary in order to provide free movement of the line 16. A second transducer 34, shown here with armature 36 and coil 35, controls the movement of line 16 in coil 30 by means of rod 33. The double coil arrangement makes possible a multiplex transmission system whereby two channels of information may be sent over a single pair of conductors.

The device shown in Fig. 3 is an alternate arrangement whereby the line 16, after a single ninety degree bend 21 is directed to a tank 40 containing fluid oil 41 or other convenient damping fluid. When this arrangement is in operation the armature 26 moves the line 16 up and down through coil 20 and varying slightly the position of the end of the line in the damping fluid. In this manner the second bend is eliminated and the apparatus is more compact.

It will be obvious from the above description that such a modulation system can be employed to send information from a transmitting circuit to a receiving station which is simple, accurate, and requires very little apparatus.

While there have been described and illustrated specific embodiments of the invention, it will be obvious that changes can be made in the transducers which move the line and various methods of securing the line to a transducer can be used. The invention should be limited only by the scope of the appended claims.

What I claim is:

1. A modulator of the class described comprising, a magnetostrictive system including a transmitting winding connected to a pulse generator, a receiving winding connected to a transmitting circuit, an aperiodic magnetostrictive line magnetically coupled to both of said windings, and a modulation transducer coupled to said line, said transducer to produce a longitudinal movement of a portion of the line through said receiving winding in response to a modulation signal.

2. A modulator of the class described comprising, a magnetostrictive system including a transmitting winding connected to a pulse generator, a receiving winding connected to a transmitting circuit, an aperiodic magnetostrictive line magnetically coupled to both of said windings, and a modulation transducer mechanically coupled to said line and connected to an external electrical source for receiving a modulation signal, said transducer arranged to produce a longitudinal movement of a portion of the line through said receiving winding in response to a modulation signal.

3. A modulator of the class described comprising, a magnetostrictive system including a transmitting winding connected to a pulse generator, a receiving winding connected to a transmitting circuit, an aperiodic magnetostrictive line magnetically coupled to both of said windings, and a modulation control means coupled to said line, said control means adapted to produce a longitudinal movement of a portion of the line through one of said windings in response to a modulation signal.

4. A modulator of the class described comprising, a magnetostrictive system including a transmitting winding connected to a pulse generator, a plurality of receiving windings each of which is connected to a transmitting circuit, a magnetostrictive line magnetically coupled to all of said windings, a plurality of modulation transducers each respectively coupled to a portion of said line for moving the portion exclusive of other portions.

5. A modulator of the class described comprising, a magnetostrictive system including a transmitting winding connected to a pulse generator, a receiving winding connected to a transmitting circuit, an aperiodic magnetostrictive line magnetically coupled to both of said windings for transmitting a magnetostrictive pulse therebetween, and a modulation transducer having a movable element thereof connected to a portion of said line for varying the pulse transmission time between windings, said transducer varying the line distance between said windings when the movable element is actuated, said distance variation being responsive to a modulation signal applied to the transducer.

6. A modulator as set forth in claim 5 wherein said transducer produces a movement which is proportional to the amplitude of the modulation signal.

7. A modulator as set forth in claim 5 wherein said transducer produces a movement which is proportional to the frequency of the modulation signal.

8. A modulator of the class described comprising, a magnetostrictive system including a transmitting winding connected to a pulse generator, a receiving winding connected to a transmitting circuit, a magnetostrictive line magnetically coupled to both windings and formed with a bend between said windings, and a modulation control means coupled to said line, said control means adapted to produce a movement of the line through one of said windings in response to a modulation signal.

9. A modulator as set forth in claim 8 wherein said movable line is terminated in a liquid damping media.

References Cited in the file of this patent

UNITED STATES PATENTS

| | | |
|---|---|---|
| 2,401,094 | Nicholson | May 28, 1946 |
| 2,495,740 | Labin et al. | Jan. 31, 1950 |
| 2,539,476 | Rines | Jan. 30, 1951 |
| 2,542,700 | Peterson | Feb. 20, 1951 |
| 2,738,386 | Roberts | Mar. 13, 1956 |